(12) United States Patent
Duary et al.

(10) Patent No.: US 9,956,502 B2
(45) Date of Patent: May 1, 2018

(54) FIXED BED APPARATUS WITH SUPPORT STRUCTURE AND METHODS FOR PROCESSING HYDROCARBONS USING THE SAME

(71) Applicant: UOP LLC, Des Plaines, IL (US)

(72) Inventors: Laltu Duary, Delhi (IN); Jonathan Tertel, Mt. Prospect, IL (US)

(73) Assignee: UOP LLC, Des Plaines, IL (US)

( * ) Notice: Subject to any disclaimer, the term of this patent is extended or adjusted under 35 U.S.C. 154(b) by 596 days.

(21) Appl. No.: 14/472,706

(22) Filed: Aug. 29, 2014

(65) Prior Publication Data

US 2016/0060544 A1    Mar. 3, 2016

(51) Int. Cl.
| | |
|---|---|
| *B01D 15/22* | (2006.01) |
| *C10G 25/00* | (2006.01) |
| *B01D 15/08* | (2006.01) |
| *B01D 15/24* | (2006.01) |
| *C10G 49/00* | (2006.01) |

(52) U.S. Cl.
CPC ............. *B01D 15/22* (2013.01); *B01D 15/08* (2013.01); *B01D 15/247* (2013.01); *C10G 25/003* (2013.01); *C10G 49/002* (2013.01)

(58) Field of Classification Search
CPC ...... B01D 15/08; B01D 15/22; B01D 15/247; C10G 25/00–25/12
See application file for complete search history.

(56) References Cited

U.S. PATENT DOCUMENTS

| | | | |
|---|---|---|---|
| 1,965,821 A | 7/1934 | Bennett | |
| 1,985,955 A | 1/1935 | Jordan | |
| 2,042,054 A | 5/1936 | Hoover | |
| 2,042,055 A | 5/1936 | Hoover | |
| 2,149,035 A | 2/1939 | Von Fuchs | |
| 2,174,810 A | 10/1939 | Von Fuchs | |
| 2,427,250 A | 9/1947 | Bond | |
| 2,593,464 A | 4/1952 | Krause | |
| 2,653,125 A | 9/1953 | Krause | |

(Continued)

FOREIGN PATENT DOCUMENTS

| | | |
|---|---|---|
| CN | 202682840 U | 1/2013 |
| GB | 629914 A | 9/1949 |
| GB | 768032 A | 2/1957 |

OTHER PUBLICATIONS

Francoise et al., A New Kerosene Mercaptan Oxidation Process, Hydrocarbon Technology International (ISSN 0952-1399) 63-66 (1993), n 1993, p. 63-66, 1993.

*Primary Examiner* — Renee Robinson

(57) ABSTRACT

Clay treatment apparatuses and methods for processing hydrocarbon products using clay treatment apparatuses are disclosed. In one exemplary embodiment, a clay treatment apparatus includes a vessel enclosing an interior space, an active clay material disposed within the interior space of the vessel, and a clay retention structure positioned above a bottom head portion of the vessel. The clay retention structure includes a wire mesh coupled with a perforated plate. In another exemplary embodiment, a method for processing a hydrocarbon product includes the steps of contacting the hydrocarbon product with an active clay material within an interior space of a vessel and passing the hydrocarbon product through a clay retention structure that includes a wire mesh and a perforated plate.

20 Claims, 3 Drawing Sheets

(56) References Cited

U.S. PATENT DOCUMENTS

| | | | |
|---|---|---|---|
| 2,759,873 A | 8/1956 | McNeill et al. | |
| 2,789,696 A * | 4/1957 | Jahnig et al. | |
| 8,197,675 B2 * | 6/2012 | Briggs | C10G 25/02 208/208 R |
| 2005/0236312 A1 * | 10/2005 | Gebauer | B01D 15/206 210/198.2 |
| 2008/0296204 A1 * | 12/2008 | Venkateshan | C10G 25/00 208/177 |

* cited by examiner

FIXED BED APPARATUS WITH SUPPORT STRUCTURE AND METHODS FOR PROCESSING HYDROCARBONS USING THE SAME

TECHNICAL FIELD

The technical field relates generally to hydrocarbon processing apparatuses and methods. More particularly, the technical field relates to fixed bed apparatuses that include support structures and methods for processing hydrocarbon products using the same.

BACKGROUND

Upgrading processes are typically catalytic reactions that remove unwanted molecules from petroleum distillates during the petroleum refining process. Oxidative demercaptization, which is also known as "sweetening" in view of the effect it has on the odor of the hydrocarbon liquid composition, is an important upgrading process. This process removes foul smelling, toxic, corrosive and unwanted sulfur-containing molecules, such as mercaptans, from the fuel stream by converting them into less harmful and odorous disulfides. It may also remove other unwanted trace polar compounds such as napthenates and phenols from the hydrocarbon liquid composition.

In the past various processes and catalysts have been used for sweetening hydrocarbon mixtures. However, today the Merox™ process, available from UOP LLC of Des Plaines, Ill., USA, has almost entirely replaced those older systems. The Merox process has been described in detail, and is well known to the person skilled in the art (see for example, U.S. Pat. No. 7,087,547; and "Merox Process for Kerosene/Jet Fuel Sweetening"—Process Technology and Equipment, (2003), published by UOP LLC).

As part of the Merox process, clay treatment (or clay filtration; e.g. using a clay treater) removes unwanted contaminants from a hydrocarbon liquid composition. Typically, the fuel is passed through a clay treater, where it comes into contact with the surface of the clay. Polar and ionic compounds, including surfactants, organometallic compounds, particulates, corrosion inhibitors, and other compounds within the fuel are adsorbed onto the surface of the clay and, thereby, removed from the fuel. Clay treatment is often used downstream of other upgrading units within the Merox process, in order to remove surfactants and other ionic species that may be introduced into the hydrocarbon composition during those processes.

Clay treatment units known in the art include concrete or clay that is used at the bottom head of the unit to support various functional components of the unit, including the "collector," which is a plurality of cylindrical conduits that extend horizontally within the clay bed of the treatment unit. After fabrication at a fabrication site, clay treatment units are typically transported in a horizontal (as opposed to vertical, upright) fashion, and because of this, the fabricator cannot put the concrete inside the clay treatment unit at the fabrication site. Accordingly, it becomes necessary to install the clay treatment unit at the refinery site, and then to add the concrete to the bottom head thereof and install the collector. This installation process increases the amount of work required at the refinery site, as compared to putting the concrete and the collector in the unit at the fabrication site.

A current trend in the petroleum processing industry is that of "modularization," wherein petroleum processing units are fabricated in modular form such that the amount of installation work necessary at the installation site is minimized. For example, much of the Merox processing system is currently available in modular form, which reduces the lead time between fabrication, installation, and ultimate operation-ready status. Due to the requirement of concrete addition after installation, the concept of modularization has proved time-consuming to implement as applied to clay treatment apparatuses.

Accordingly, it is desirable to provide improved clay treatment apparatuses for removing unwanted contaminants from a hydrocarbon liquid composition and methods employing the use of such apparatuses. Furthermore, it is desirable to provide such clay treatment apparatuses in modular form to reduce the on-site work required to install such apparatuses. Still further, it is desirable to provide such clay treatment apparatuses that do not require concrete as a collector support at the bottom head portion thereof. Furthermore, other desirable features and characteristics of the presently disclosed embodiments will become apparent from the subsequent detailed description and the appended claims, taken in conjunction with the accompanying drawings and this background.

BRIEF SUMMARY

Clay treatment apparatuses and methods for processing hydrocarbon products using clay treatment apparatuses are disclosed. In one exemplary embodiment, a clay treatment apparatus includes a vessel enclosing an interior space, an active clay material disposed within the interior space of the vessel, and a clay retention structure positioned within a bottom head portion of the vessel. The clay retention structure includes a wire mesh coupled with a perforated plate.

In another exemplary embodiment, a method for processing a hydrocarbon product includes the steps of contacting the hydrocarbon product with an active clay material within an interior space of a vessel and passing the hydrocarbon product through a clay retention structure that includes a wire mesh and a perforated plate.

In yet another exemplary embodiment, a collector-less clay treatment apparatus includes a collector-less vessel including a vertically-oriented cylindrical body and enclosing an interior space, a distribution nozzle positioned below an upper head portion of the vessel, an Attapulgus active clay material disposed within the interior space of the vessel, and a circular clay retention structure having a diameter smaller than an inner diameter of the vessel and positioned within a bottom head portion of the vessel. The circular clay retention structure includes a wire mesh or profile wire, including openings sufficiently small to retain the active clay material above the clay retention structure, and is coupled with and abuttingly disposed against a perforated plate. The circular clay retention structure also includes a support ring abuttingly disposed against the perforated plate and the bottom head portion of the vessel. The apparatus further includes an outlet nozzle disposed below the clay retention structure.

BRIEF DESCRIPTION OF THE DRAWINGS

The various embodiments will hereinafter be described in conjunction with the following drawing figures, wherein like numerals denote like elements, and wherein.

DETAILED DESCRIPTION

Figure 1:
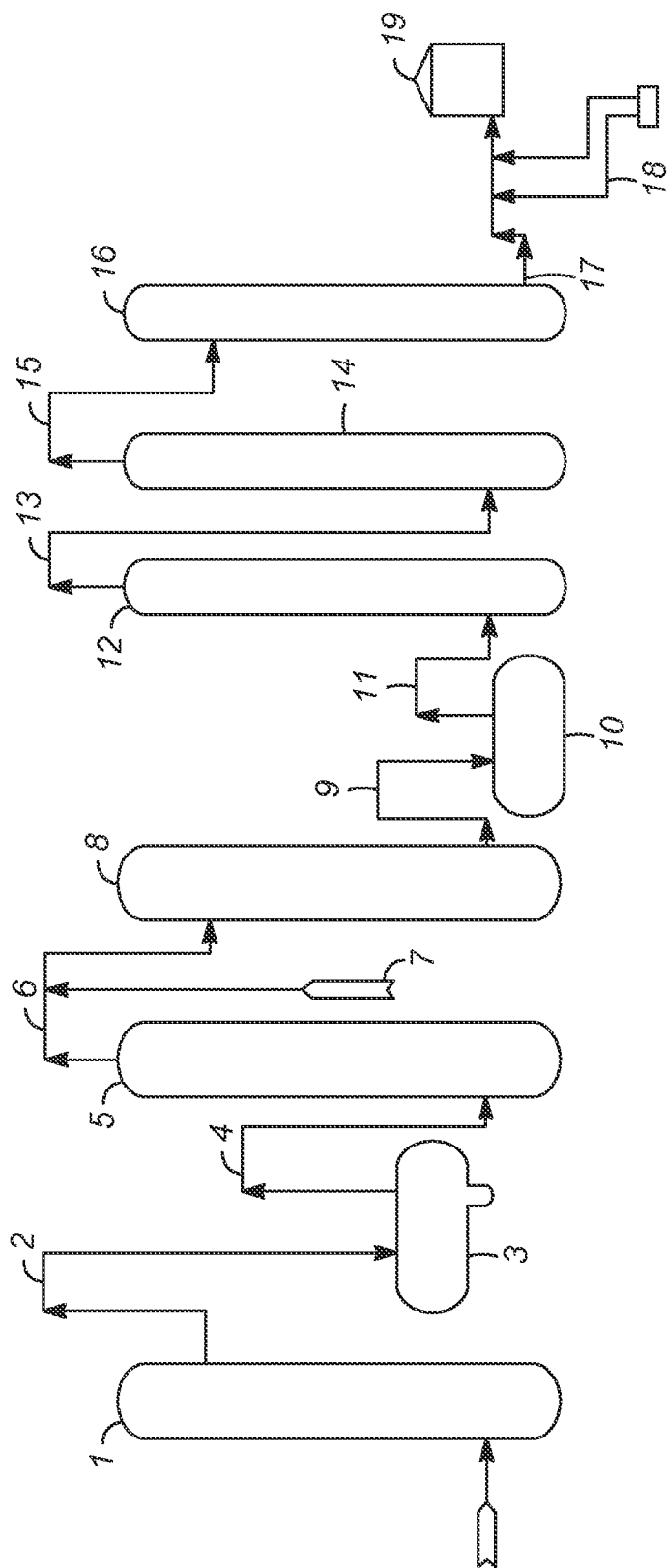
FIG. 1 is a flow diagram illustrating a process for the upgrading of kerosene originating from crude petroleum that incorporates a clay treatment apparatus in accordance with one embodiment of the present disclosure.

The following detailed description is merely exemplary in nature and is not intended to limit the various embodiments or the application and uses thereof. Furthermore, there is no intention to be bound by any theory presented in the preceding background or the following detailed description.

The present disclosure is directed to various embodiments of clay treatment apparatuses for removing unwanted contaminants from a hydrocarbon liquid composition, and methods for processing hydrocarbon products employing the use of the same. The disclosed clay treatment apparatuses include a perforated plate and wire mesh support structure at the bottom head portion of the vessel. The wire mesh is provided with a small enough profile to prevent the clay particles from passing therethrough, and thus the need for a separate collector having such wire mesh is eliminated. Accordingly, the need for the traditional concrete collector support structure is also eliminated. In that sense, embodiments described herein may be referred to as "collector-less" with regard to the described apparatus or vessel. As used herein, the term "collector-less" describes an apparatus or vessel that excludes any collector structures as well as any collector support structures. The disclosed clay treatment apparatuses may thus be provided in modular form to reduce the on-site work required to install the apparatus.

For purposes of this disclosure, when the terms "upper", "middle", "top" or "lower" are used with respect to a clay treatment apparatus, these terms are to be understood as relative to each other, i.e. that withdrawal of a stream from the "top" of the unit is at a higher position than the stream withdrawn from a "lower" portion of the unit. When the term "middle" is used it implies that the "middle" section is somewhere between the "upper" and the "lower" section of the unit. However, when the terms "upper", "middle" and "lower" have been used with respect to a clay treatment unit it should not be understood that such a unit is strictly divided into thirds by these terms.

As used herein, the term "head" may refer to one of a pair of caps on a cylindrically-shaped vessel. Generally, the head may be of a variety of shapes, such as hemispherical, ellipsoidal, torispherical, flat, diffuser-shaped, or conical. As used herein, the term "coupled" may mean the relationship between two items that are directly or indirectly, joined, fastened, associated, connected, or formed integrally together either by chemical or mechanical means, by processes including stamping, molding, or welding. Two items may be coupled by the use of a third component such as a mechanical fastener, e.g. a screw, a nail, a staple, or a rivet; an adhesive; or a solder. As used herein, the term "fluid" may mean a gas, a liquid, a suspension that may include one or more solid particles, or a combination thereof. A fluid may include or consist of one or more hydrocarbons. Furthermore, as used herein, a referenced dimension, such as a length, a width, or a height, may be the maximum such dimension for a structure, such as a body, a trough, or a plate.

As initially noted above, the clay treatment apparatuses of the present disclosure may be used in connection with a Merox process system. However, the disclosed apparatuses are not limited to such uses. Rather, it is expected that the disclosed apparatuses will find use wherever clay treatment is required or desirable for the removal of unwanted contaminants from a hydrocarbons stream. To serve as an exemplary, non-limiting illustration of one possible installation of such a clay treatment apparatus, a Merox process flow scheme is briefly introduced that includes a clay treatment apparatus in accordance with the present disclosure.

FIG. 1 is a flow diagram illustrating a process for the upgrading of kerosene originating from crude petroleum. A crude petroleum starting material is first fed into a separation device in the form of a distillation column 1, which fractionates the crude into mixtures of hydrocarbons having closely related boiling points. The exemplary distillation column is under atmospheric pressure; although reduced pressure may also be used, especially for the fractionation of heavy distillate compounds (i.e., those that boil at very high temperatures, e.g., above 500° C.). Kerosene, which is typically used in the production of jet fuel, for example, has an initial boiling point of approximately 147° C.

Kerosene is removed from the distillation column 1 and passed via a continuous pipeline 2 to a device for removing water contamination, for example, in the form of a water coalescer 3. The water coalescer 3 generally includes a large diameter coalescer vessel that is commonly horizontally mounted. Inside the coalescer vessel is packed a coalescing media element, which is typically made up of closely woven steel wires, glass fiber strands, wood shavings and the like. The flow velocity of the fuel/water mixture is reduced on entering the coalescer vessel and, due to the low velocity and differences in the densities of the fuel and water, the fuel and water are segregated. As the mixture flows through the coalescer media, water coalesces into larger droplets and sinks to the bottom of the vessel from where it may be removed through a dip leg while the dry fuel passes through.

The fuel is then passed via a continuous pipeline 4 to a container where a caustic (i.e., alkaline) prewash is carried out in a caustic prewash vessel 5. From the caustic prewash 5 the alkaline fuel is passed by a continuous pipeline 6 to a Merox reactor 8. At some point, air at a suitable pressure and a Merox catalyst are added to the kerosene in order to convert any mercaptans in the fuel into disulfides. This is accomplished by injecting air (injection point not shown). In the alternative, the Merox reactor 8 may contain a solid bed Merox catalyst (for example, charcoal granules impregnated with catalyst). Additional details regarding operation of the reactor 8 may be found in U.S. Pat. No. 7,223,332.

After leaving the Merox reactor 8, the now sweetened fuel is passed via pipeline 9 to a caustic settler 10. The caustic settler 10 removes any caustic that has been carried through from the reactor 8. Once the caustic has settled out it may be drained from the bottom of the settler 10.

The sweetened kerosene is then passed from the settler 10 through a continuous pipeline 11 to a water wash vessel 12, which is designed to wash residual caustic out of the sweetened kerosene. The water wash vessel 12 may have a separate inlet (not shown) for the introduction of water, and a separate outlet at the bottom of the vessel (also not shown) for removing residual water. The kerosene is then passed, for example via a continuous pipeline 13, to a salt settler vessel 14. The salt settler vessel 14 contains a bed of rock salt, which removes the entrained water from the sweetened kerosene, and an outlet at the bottom (not shown) for removing any extracted water.

In the process depicted, fuel exiting the salt settler vessel 14 via pipeline 15 is passed into a clay treater 16. As previously described, the clay treater 16 may act as a polar trap and as a filter, removing oil-soluble substances such as metal ions and oxides, surfactants, organometallic compounds and particulate matter, which could prevent the fuel from satisfying the required product specifications. The clay treating is carried out at a temperature of from about 30 to about 60° C. (more typically from about 35 to about 45° C.) and, independently, at a pressure of from about 50 to about 300 psig. The provided clay treater 16 does not include any collector structure or any concrete collector support structure at a bottom head portion thereof, but rather makes use of a perforated plate/wire mesh support structure. As such, clay treater 16 is a collector-less apparatus. This support structure enables the clay treater 16 to be provided as a modular unit for the described Merox flow process, thus reducing installation time and saving installation costs. Greater detail regarding clay treater 16 is provided below in connection with FIGS. 2-4.

Finally, the sweetened kerosene is transferred by pipeline 17 to a storage tank 19 where it may remain until it leaves the refinery. At a point before the fuel leaves the refinery, it may be necessary to add chemical additives in order to satisfy the necessary product specifications/parameters. In the process shown, any additives are introduced from an additive supply 18 before the fuel enters the storage tank 19. It will be appreciated that before and after the addition of additives it may be necessary to test the product specifications of the sweetened kerosene (not shown).

Figure 2:
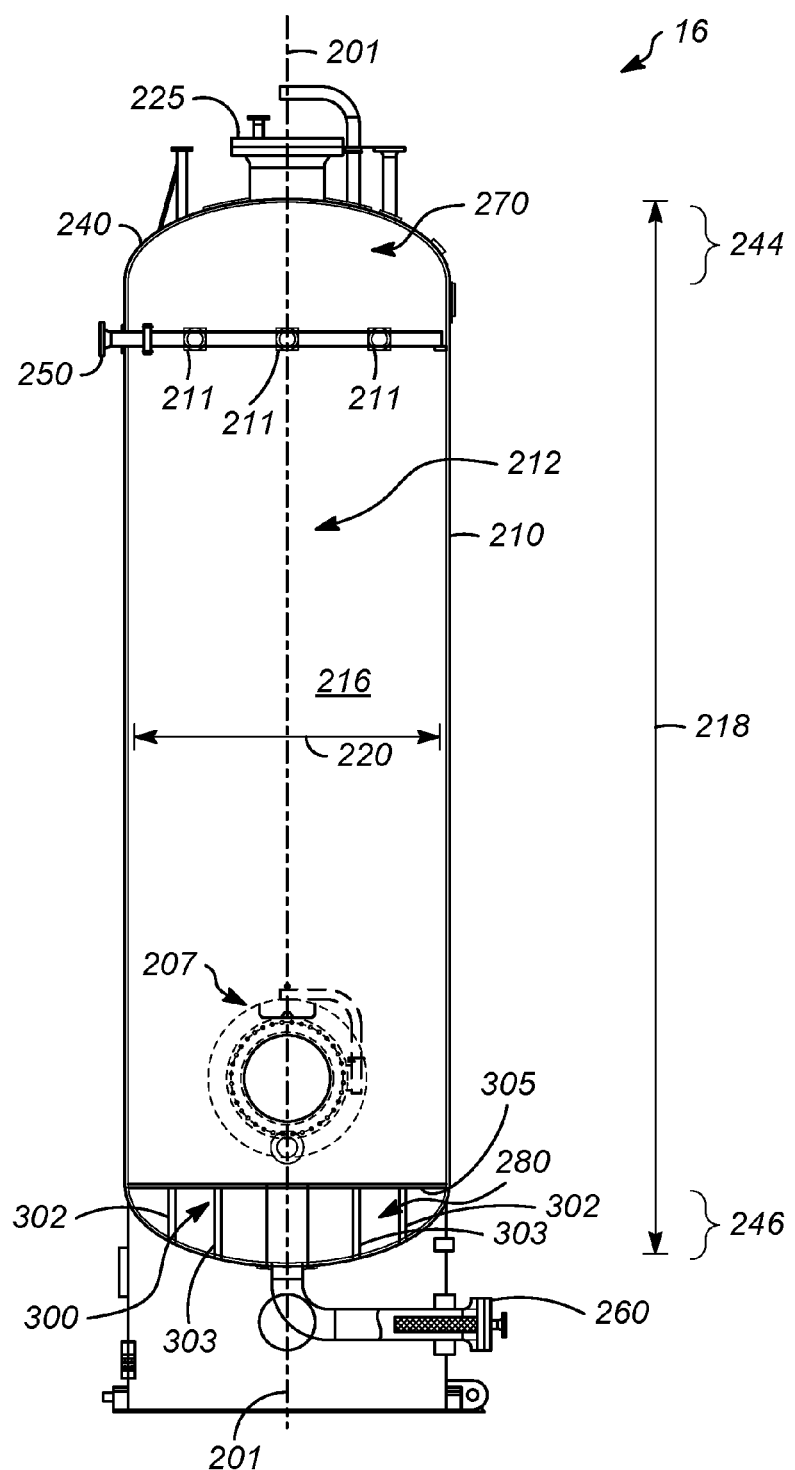
FIG. 2 is a cross-sectional and elevational view of the exemplary clay treatment apparatus shown in FIG. 1.

FIG. 2 is a cross-sectional and elevational view of the exemplary collector-less clay treatment apparatus 16 shown in FIG. 1. As shown therein, clay treatment apparatus 16 includes a body or shell 210 forming a substantially cylindrical structure 240 with a first head 270 at one end 244 and a second head 280 at an opposing end 246. The substantially cylindrical structure 240 may be orientated substantially vertically along a central axis 201, as shown. Generally, the body 210 may contain an interior space 212 that may be filled with an active material 216, which may be an adsorbent, such as a clay absorbent material. Any clay suitable for processing hydrocarbons may be used, for example Engelhard F-24 clay, Filtrol 24, Filtrol 25, and Filtrol 62, Attapulgus clay, or Tonsil clay (or a combination of any two or more of the foregoing). A manway 207 may be provided along the body 210 to allow access into the interior space 212. A manway 225 above the first head 270 may provide additional access into the interior space 212. The body 210 of the vessel 300 may include, optionally substantially uniform, a length 218 and a width (diameter) 220. Generally, the width 220 corresponds to the diameter of the substantially cylindrical structure 240.

The clay treatment apparatus 16 may include at least one or a plurality of inlets 250 for receiving a fluid and at least one outlet or plurality of outlets 260 for an exiting fluid. Generally, the at least one inlet 250 and at least one outlet 260 may be pipes or other structures for conveying fluids to and from the apparatus 16. Usually, the at least one inlet 250 is positioned at a top of the apparatus 16 and the at least one outlet 260 may be positioned at a bottom of the apparatus 16. Connected to the inlet pipe 250 is one or a plurality of distributor nozzles 211, which serve to distribute the flow of the un-treated hydrocarbon fluid within the interior of the body 210. The un-treated hydrocarbon fluid thus flows from the distributor nozzles 211 into the body 210, which contains the active material 216, and as it passes downward through the active material, the hydrocarbon fluid is treated to remove the unwanted impurities.

As is generally known in the art, a common type of liquid collector assembly suitable for use in clay treatment apparatuses includes a plurality of cylindrical conduits extending horizontally into the clay bed about a common transverse plane of the vessel at a constant height. The cylindrical conduits have perforated surfaces and/or a wire screen to prevent clay particle entry into the conduits, are each closed at one end, and are each in common flow communication with a piping manifold at the opposite end. As previously noted, however, the clay treatment apparatus of the present disclosure does not include a traditional collector structure, and accordingly it does not include any concrete disposed in the second or lower head portion 280 of the body 210 to support such a collector structure. In place of the collector, to provide an effective separating means to withdraw the treated fuel from the clay treatment apparatus, a support structure 300 is provided, which will be described in greater detail below with additional reference to FIGS. 3 and 4.

Figure 3:
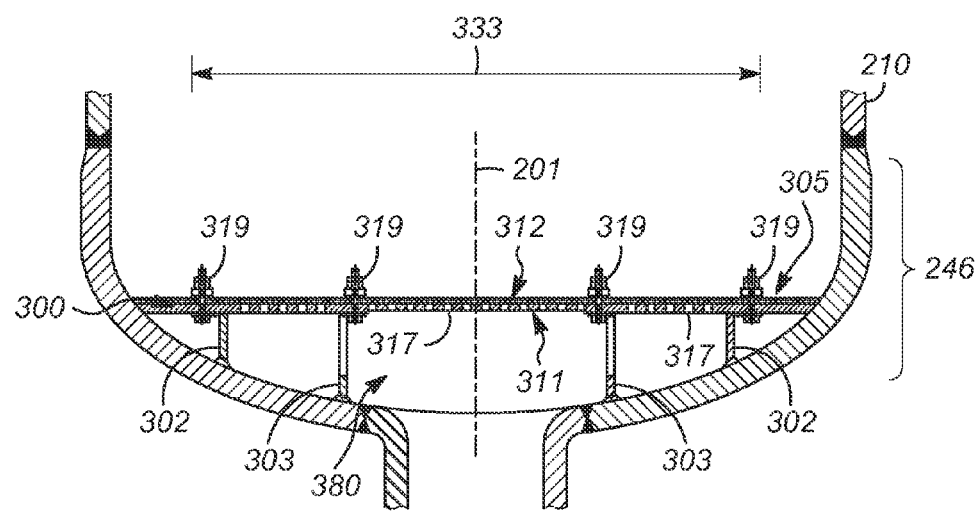
FIG. 3 provides a vertical cross-section and enlarged view of a lower head portion of the exemplary clay treatment apparatus shown in FIG. 2.
Figure 4:
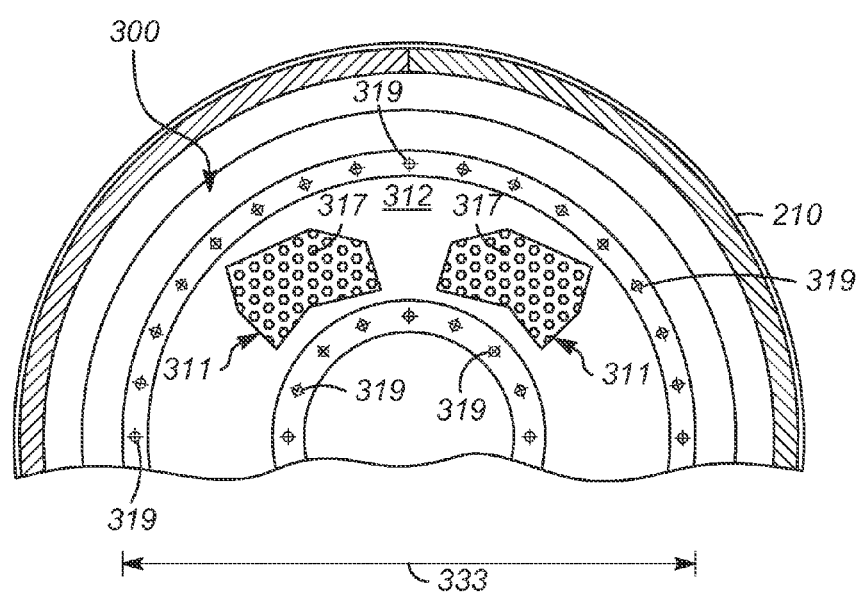
FIG. 4 provides a horizontal cross-section and enlarged view of the lower head portion of the exemplary clay treatment apparatus shown in FIG. 2.

Particularly, FIG. 3 provides a vertical cross-section and enlarged view of the lower head portion 280 of apparatus 16, and FIG. 4 provides a horizontal cross-section and enlarged view of the lower head portion 280. As shown therein, the support structure 300 includes first and second concentric support rings 302, 303 that are coupled, at a lower end thereof, with the body 210 (of the lower head portion 280), and at an upper end thereof, with a clay retention structure 305. Concentric support rings 302, 303 may be continuous along their circumference, or they may be discontinuous (i.e., having gaps therealong). The second or inner support ring 303 will have a greater height due to the increased distance between the body 210 and the clay retention structure 305 at the lower end of the second head 280.

The clay retention structure 305 includes a perforated support plate 311 with a wire mesh 312 disposed thereover. The retention structure may be circular in shape to correspond with the shape of the vessel 240, although it is not necessary that the retention structure 305 have as great of a diameter 333 as the vessel 240 (i.e., diameter 220). That is, the periphery of the clay retention structure 305 and the interior of the body 210 need not be provided in abutting adjacency, but it may be desirable to have such abutting adjacency in some embodiments to prevent clay from bypassing. The perforated support plate 311 may be coupled with the wire mesh 312 using a plurality of fastening devices 319, such as screws bolts, and the like.

The perforated support plate 311 may have a plurality of perforations 317 therein which may be substantially uniform in size (for example within about plus or minus 20% area of each other, such as about plus or minus 5% area). Further, the perforations 317 may be substantially equally spaced from each other and uniformly about the plate 311 so that substantially equal amounts of treated fuel will flow through each perforation. In other words, the flow rate through each perforation may be substantially the same, e.g., within about 20% of each other. The combined cross-sectional area of the perforations 317 in the plate 311 may be from about 0.3 to about 30%, for example from about 0.6 to about 10% of the total cross-sectional area of the plate 311. Each perforation may have a cross-sectional area of from about 0.00001 to about 0.7%, such as from about 0.0008 to about 0.35% based on the diameter 333 of the clay retention structure 305. Generally, perforation 317 sizes of from about ⅛ to about ¾ inch may be employed in such perforated plate 311.

The wire mesh 312 may be formed as a profile wire screen using no. 63 wire. The openings in the wire mesh may be from about 0.003 to about 0.013 inch, for example about 0.005 to about 0.010 inch. Such profile wire screens have traditionally been used for the mesh required for collector assemblies, and as such are well-suited to retaining the smaller clay particle sizes found in clay treatment apparatuses. In some embodiments, if profile wire screen is used, it may not be necessary to have the additional perforated plate, as the profile wire has structural stability.

In operation, the fuel flows downward through the active clay material 216, passes through the wire mesh 312, and then passes through the perforated plate 311. Thereafter, from the lower head 280, the treated fuel passes through the outlet nozzle 260 positioned at the base of the vessel 240. The active clay material 216, which is too large to pass through the wire mesh 312, is effectively retained by the clay retention structure 305. Additionally, due to the fact that a separate collector is not required (which was traditionally positioned above a concrete support), the entire amount of clay material 216 above the retention structure 305, not just that part above the collector, may be used for treating the fuel, thus improving the efficiency of the clay treatment apparatus 16. In other words, vessel volume can be reduced.

Accordingly, described herein are various embodiments of clay treatment apparatuses for removing unwanted contaminants from a hydrocarbon liquid composition, as well as embodiments of methods for processing hydrocarbon products that employ the use of such clay treatment apparatuses. The disclosed clay treatment apparatuses include perforated plate and wire mesh support structures that retain the active clay material at the bottom head portion of the vessel, and serve in place of the traditional collector structure. Accordingly, there is no need to pour concrete into the apparatus after installation thereof at the installation site to support a collector. The disclosed clay treatment apparatuses may thus be provided in modular form with the perforated plate and wire mesh support structure pre-installed at the fabrication site, to reduce the installation site work required to install the clay treatment apparatus.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A clay treatment apparatus comprising:
    a vessel enclosing an interior space;
    an active clay material disposed within the interior space of the vessel;
    a clay retention structure positioned within a bottom head portion of the vessel, wherein the clay retention structure comprises a wire mesh coupled with a perforated plate; and
    at least one support ring coupled at a first end to the perforated plate and coupled at a second end with the bottom head portion of the vessel.

2. The apparatus of claim 1, wherein the vessel comprises a vertically-oriented cylindrical body.

3. The apparatus of claim 1, wherein the active clay material comprises an Attapulgus clay.

4. The apparatus of claim 1, wherein the apparatus further comprises a distribution nozzle positioned below an upper head portion of the vessel.

5. The apparatus of claim 1, wherein the clay retention structure comprises the wire mesh abuttingly disposed against the perforated plate.

6. The apparatus of claim 1, wherein the clay retention structure further comprises a second support ring abuttingly disposed against the perforated plate and the bottom head portion of the vessel, the second support ring and the first support ring being concentric.

7. The apparatus of claim 1, wherein the clay retention structure comprises a circular configuration.

8. The apparatus of claim 1, wherein the clay retention structure comprises a diameter that is smaller than an inner diameter of the vessel.

9. The apparatus of claim 1, further comprising an outlet nozzle disposed below the clay retention structure.

10. The apparatus of claim 1, wherein the interior of the vessel excludes a collector structure.

11. The apparatus of claim 1, wherein the interior of the vessel excludes a collector support structure.

12. The apparatus of claim 1, wherein the wire mesh comprises openings sufficiently small to retain the active clay material above the clay retention structure.

13. A collector-less clay treatment apparatus comprising:
    a collector-less vessel comprising a vertically-oriented cylindrical body and enclosing an interior space;
    a distribution nozzle positioned below an upper head portion of the vessel;
    an Attapulgus active clay material disposed within the interior space of the vessel;
    a circular clay retention structure having a diameter smaller than an inner diameter of the vessel and positioned within a bottom head portion of the vessel, wherein the circular clay retention structure comprises a wire mesh comprising openings sufficiently small to retain the active clay material above the clay retention structure and is coupled with and abuttingly disposed against a perforated plate, and a pair of concentric support rings each abuttingly disposed against the perforated plate and the bottom head portion of the vessel, wherein a first ring has a height greater than a height of the second ring; and
    an outlet nozzle disposed below the clay retention structure.

14. A method for processing a hydrocarbon product comprising the steps of:
    contacting the hydrocarbon product with an active clay material within an interior space of a vessel; and
    passing the hydrocarbon product through a clay retention structure positioned within a bottom head portion of the vessel, wherein the clay retention structure comprises a wire mesh coupled with a perforated plate and wherein at least one support ring is coupled at a first end to the perforated plate and coupled at a second end with the bottom head portion of the vessel.

15. The method of claim 14, further comprising the step of passing the hydrocarbon product into the interior space of the vessel prior to contacting the hydrocarbon product with the active clay material.

16. The method of claim 14, further comprising the step of removing the hydrocarbon product from the interior space of the vessel after passing the hydrocarbon product through the clay retention structure.

17. The method of claim 14, further comprising the step of demercaptizing the hydrocarbon product prior to contacting the hydrocarbon product with the active clay material.

18. The method of claim 14, wherein the hydrocarbon product comprises a kerosene-based hydrocarbon product.

19. The method of claim 14, wherein the active clay material comprises an Attapulgus clay.

20. The method of claim 14, wherein the interior space of the vessel excludes a collector structure or a collector support structure.

* * * * *